F. POOLE.
LIQUID HEATER.
APPLICATION FILED FEB. 2, 1915.
1,213,254.
Patented Jan. 23, 1917.
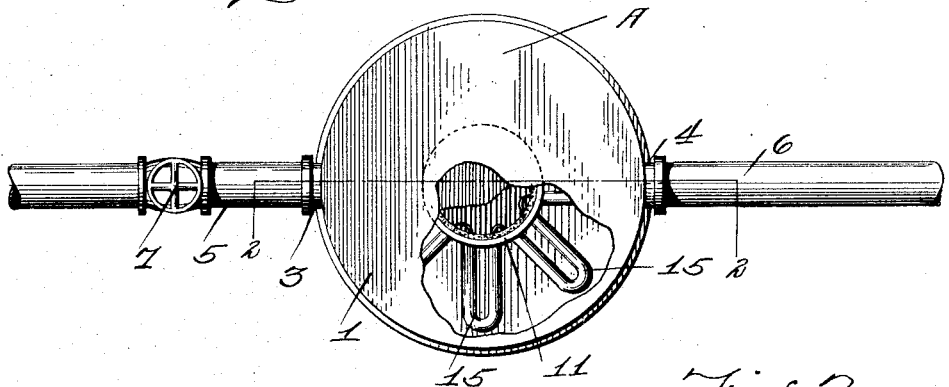
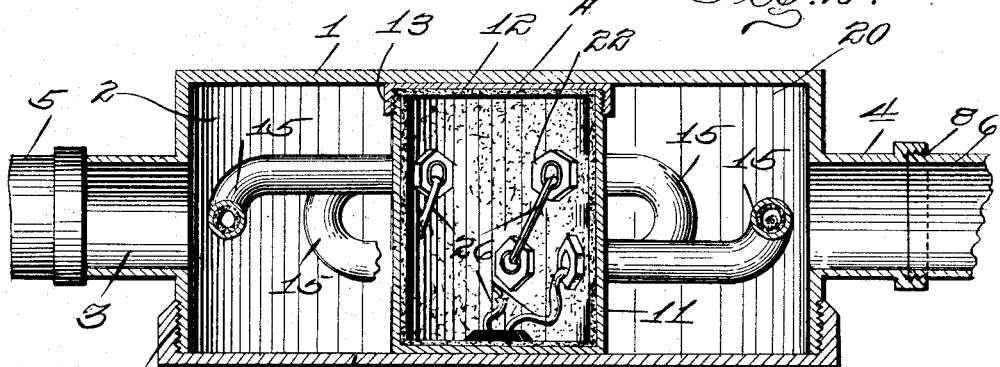
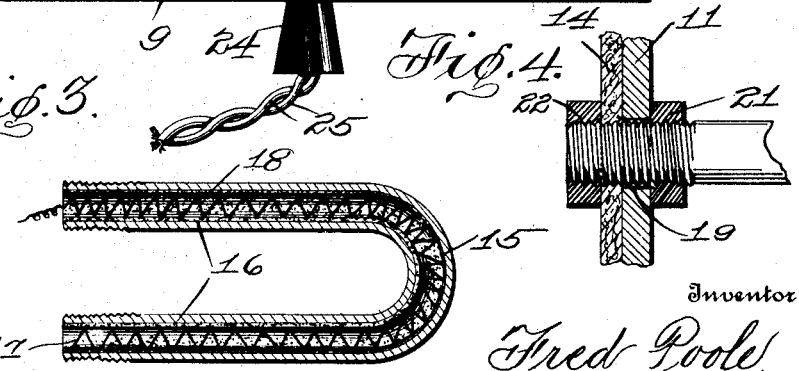
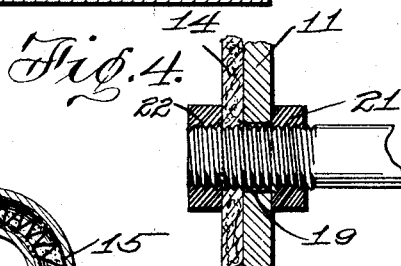
Witnesses
Inventor
Fred Poole,
By Richard B. Owen,
Attorney

UNITED STATES PATENT OFFICE.

FRED POOLE, OF JEWELL, KANSAS.

LIQUID-HEATER.

1,213,254.     Specification of Letters Patent.     Patented Jan. 23, 1917.

Application filed February 2, 1915. Serial No. 5,739.

*To all whom it may concern:*

Be it known that I, FRED POOLE, a citizen of the United States, residing at Jewell, in the county of Jewell and State of Kansas, have invented certain new and useful Improvements in Liquid-Heaters, of which the following is a specification.

My invention relates to liquid heaters, and more particularly to a heater for "instantaneously" heating water or the like during passage through a conduit.

The primary object of my invention is to provide an improved heater which is capable of disposition in a water conduit or the like, and I provide a suitable casing in which this heater may be disposed.

Another object of my invention is to so construct the heater as to render the parts interchangeable and to allow of its ready access.

Another object of my invention is to provide a heater which may be used in connection with any receptacle, and need not necessarily be applied to a water conduit, the construction being such as to facilitate removal of the heater bodily or allow of independent removal of the various parts thereof for repair or replacing.

Another object of my invention is to provide suitable supporting means for a plurality of heating elements which, taken as a whole, embody the preferred form of my invention, the said supporting means being so formed as to facilitate access to the interior thereof.

A still further object of my invention is to provide a liquid heater having a plurality of heating members carried thereby and suitable means for connecting said heating members in their normal position, and I also provide suitable electric heating units in each of said heating members.

With the above and other objects in view my invention resides preferably in the construction, combination, and arrangement of parts as hereinafter set forth in the specification and illustrated in the accompanying drawings, in which—

Figure 1 is a top plan view of my improved liquid heater, a portion of the same being broken away to illustrate the interior arrangement thereof. Fig. 2 is a vertical sectional view taken on the line 2—2 of Fig. 1. Fig. 3 is a detail sectional view of one of the heating members which I employ, and Fig. 4 is a detail sectional view showing an improved means for detachably supporting said heating members in their respective positions.

Similar reference characters indicate similar parts throughout the various views of the drawings.

Referring more particularly to the drawing, in which the preferred embodiment of my invention is illustrated, I provide a casing indicated as a whole by the letter A of substantially cylindrical configuration having a closing end wall 1 and a peripheral wall 2. The said peripheral wall is provided at preferably diametrically opposite points with inlet and outlet nipples 3 and 4, respectively, for connection with a water conduit 5, and a continuance thereof 6, the said water conduit 5 being controllable by means of a valve 7. The nipple 4 is shown in Fig. 2 as in threaded engagement with the portion 6, this being designated by the numeral 8.

The casing A has one end thereof open, the said open end being closed by a cap 9, the said cap 9 being in threaded engagement with the peripheral wall 2 of the casing A as shown at 10.

From the above it will be noted that the casing A is interposed in a pipe line and that water or the like passing through the pipe line must necessarily pass through the casing A, and while the casing A has been shown as cylindrical in configuration, it is desired that it be understood that the shape of the casing does not affect the operation or advantages of my invention.

The heating means which I provide consists preferably of two component parts, namely, a supporting structure and heating members carried thereby. The supporting structure mentioned comprises preferably a casing 11 disposed within the casing A and substantially concentric with the longitudinal axis thereof, the said casing 11 being detachably associated with the closure 9. The casing 11 has been shown of a depth approximately the same as the depth of the casing A, but this is not necessary. The end of the casing 11 remote from the closure 9 is preferably open, the said open end being closed by means of a screw cap 12, the said cap 12 being in threaded engagement with the peripheral wall of the casing 11 as indicated at 13. The casing 11 and cap 12 are lined with an insulating material 14 of any approved character, this insulating material preferably being fire proof and water proof. As shown to advantage in Fig. 1 the said casing 11 is preferably cylindrical in configuration for a purpose which will hereinafter become apparent although the contour of the casing 11 need not necessarily be cylindrical but may be any shape which will attain the object set forth.

The heating members which I provide in this form of my invention comprise tubular containers 15 bent into substantially U-shape configuration having parallel arms 16. The said parallel arms 16 are of a similar length and are both threaded externally for a purpose which will hereinafter become apparent. The said tubular containers 15 which comprise the heating members of the present invention are lined internally with an insulating material which is water proof and fire proof indicated at 17. An electric heating unit comprising a coil 18 is disposed within each of the tubular containers 15, each of the tubular containers being substantially alike in construction. In order to mount the tubular containers 15 on the supporting casing 11, a plurality of alternately arranged apertures are provided in said casing, one of these apertures being shown in Fig. 4 and indicated at 19. The threaded extremities of the arms 16 of the containers 15 are receivable within certain of the said apertures 19, said apertures 19 being in such relative disposition in the peripheral wall of the casing 11 that the tubular members 15 will be slightly angularly disposed one above the other to the longitudinal axis of the casing 11. The said heating members heretofore termed containers are preferably radially disposed on the peripheral wall of the casing 11, and extend into the space 20 provided between the outer face of the casing 11 and the inner face of the casing A so that liquid passing therebetween will be forced to circulate in contact with the several heating members 15. Any number of these heating members may be employed, and in this connection, it might be well to state that the peculiar manner in which the threaded extremities of the arms 16 are engaged with the casing 11 relative to the longitudinal axis thereof disposes the said heating members in such a manner that the liquid passing in contact therewith is assured of a thorough circulation. It will be noted upon reference to Fig. 2 that the above mentioned arrangement also facilitates access to the securing means hereinafter described, so that an instrument for removal of the securing means may be readily applied without contact or dislodgment of the several other securing means contained in the device.

Any suitable means may be employed for securing the threaded extremities of the arms 16 with the peripheral wall of the casing 11 but I have illustrated preferred means in Fig. 4 wherein I provide a pair of securing nuts 21 and 22. The said nuts 21 and 22 carried by the arms 16, embrace the peripheral wall of the casing 11 adjacent the apertures 19 in each instance, so that the respective threaded extremities of each of the arms 16 of each of the heating members 15 are rigidly connected to the peripheral wall 11, resulting in the supporting of the heating members 15 in a relatively radial disposition. It is preferred that some water proof material be utilized in each of these connections, such as white lead or the like, and the securing nuts 21 and 22 may be provided with any approved locking means, although this is not necessary.

Any suitable means for supplying electrical energy to the heating units 18 may be employed, but I prefer the form of connecting means illustrated in the drawings, and this connector is indicated in Fig. 2 at 24, leads 25 being associated therewith, said leads being connected with any suitable source of electrical energy. Suitable leads 26 are provided within the casing 11 for connecting the various heating units 18 in any desired relation. It is to be understood that I do not limit myself to any specific manner of connecting the casings 11 and 9.

The operation of my invention is thought to be clearly apparent from the above description and examination of the accompanying drawing, and it will be noted that liquid passing through the casing A from inlet to outlet will be forced to circulate in the space 20 hereinbefore referred to, thorough circulation of the liquid being assured by the peculiar disposition of the radially extending heating members 15.

Changes within the purview of the invention may be made without departing from the spirit and scope of the invention as claimed.

I claim—

1. In a liquid heater the combination of a casing interposed in a water conduit or the like, a cylindrical supporting body centrally located in said casing, and a plurality of heating members having their inner extremities respectively in a plane diagonally to the longitudinal axis of the supporting body, the said inner extremities being alternately disposed in the wall of said supporting body, as and for the purpose set forth.

2. In combination, a casing interposed in a water conduit, a second casing concentrically arranged in said first casing and carrying a plurality of U-shaped angularly arranged radially extending heating members, whereby to aid circulation of liquid passing between said casings.

3. In a liquid heater the combination of a casing interposed in a water conduit or the like, a supporting casing carried therein, radially extending heating members associated with said inner casing having the inner extremities thereof alternately arranged in said casing, and means for securing said heating elements rigidly to the casing.

4. A liquid heater, including a casing interposed in a water conduit or the like, a supporting casing receivable within said first-mentioned casing, a plurality of heat radiating members carried by said inner casing and extending laterally in the water space between said inner and outer casings, inlet and outlet means for said first-mentioned casing, electric heating units carried in each of said heat radiating members, and means for detachably securing said heat radiating members in position.

5. In a liquid heater, the combination of an outer casing interposed in a water conduit or the like, an inner casing affording a supporting body, heat radiating members carried by said inner casing and extending laterally in the space between said casings, said heat radiating members being so disposed relative to each other as to cause the liquid to assume a substantially zigzag course from inlet to outlet.

6. In combination, a casing, interposed in a water conduit, a second casing concentrically arranged with said first casing and carrying a plurality of U-shaped radially extending heating members, said members having their inner extremities arranged in a plane diagonal to the longitudinal axis of the supporting body whereby to aid circulation of liquid passing between said casings, and means detachably securing said heating members in position.

In testimony whereof I affix my signature in presence of two witnesses.

FRED POOLE.

Witnesses:
 FRED V. KREAMER,
 A. C. ELY.

Copies of this patent may be obtained for five cents each, by addressing the "Commissioner of Patents, Washington, D. C."